(12) United States Patent
Ponziani (10) Patent No.: US 7,191,084 B2
(45) Date of Patent: Mar. 13, 2007

(54) METHOD AND APPARATUS FOR GAS TURBINE ENGINE IGNITION SYSTEMS

(75) Inventor: Robert Louis Ponziani, West Chester, OH (US)

(73) Assignee: General Electric Company, Schenectady, NY (US)

( * ) Notice: Subject to any disclaimer, the term of this patent is extended or adjusted under 35 U.S.C. 154(b) by 1 day.

(21) Appl. No.: 11/110,487

(22) Filed: Apr. 20, 2005

(65) Prior Publication Data

US 2006/0241886 A1    Oct. 26, 2006

(51) Int. Cl.
*G06F 19/00* (2006.01)
*F02P 17/00* (2006.01)

(52) U.S. Cl. ...................... 702/114; 324/401
(58) Field of Classification Search ............... 702/114; 60/776, 772, 778; 324/393, 399, 400, 401, 324/402; 123/609; 313/143; 701/100, 101
See application file for complete search history.

(56) References Cited

U.S. PATENT DOCUMENTS

| | | | | |
|---|---|---|---|---|
| 3,867,717 A | * | 2/1975 | Moehring et al. | 340/626 |
| 4,032,842 A | | 6/1977 | Green et al. | |
| 4,194,357 A | * | 3/1980 | Matulich et al. | 60/772 |
| 5,103,629 A | * | 4/1992 | Mumford et al. | 60/778 |
| 5,155,437 A | * | 10/1992 | Frus | 324/399 |
| 5,399,942 A | * | 3/1995 | Frus | 315/209 R |
| 5,446,348 A | * | 8/1995 | Michalek et al. | 315/209 SC |
| 5,561,350 A | * | 10/1996 | Frus et al. | 315/209 R |
| 5,675,257 A | * | 10/1997 | Frus | 324/380 |
| 6,067,032 A | * | 5/2000 | Anderson et al. | 340/966 |
| 6,976,351 B2 | * | 12/2005 | Catharine et al. | 60/39.281 |
| 2005/0043870 A1 | * | 2/2005 | Joshi et al. | 701/30 |
| 2006/0037326 A1 | * | 2/2006 | Mehrer et al. | 60/776 |

OTHER PUBLICATIONS

Naegeli et al., ignition Study in a Gas Turbine Combustor, 1991, Combust. Sci. and Tech., vol. 80, pp. 165-184.*
Xing-Qiang et al., A Mathematical Model and Experimenta Investigation on Increasing Starting Altitude of Turbine Engine, 1995 IEEEI.*

* cited by examiner

*Primary Examiner*—Michael Nghiem
*Assistant Examiner*—Toan M. Lee
(74) *Attorney, Agent, or Firm*—William Scott Andes; Armstrong Teasdale LLP (57) ABSTRACT

A method for testing an igniter coupled within a gas turbine engine, wherein the gas turbine engine includes a combustor, a pressure transducer coupled to the combustor, and a spark detector. The method includes operating the gas turbine engine, monitoring the operating pressure within the gas turbine engine, operating the igniter when the monitored pressure is within a first predefined pressure range, and generating a first indication if the igniter failed to generate a spark within the first predefined pressure range.

20 Claims, 4 Drawing Sheets

METHOD AND APPARATUS FOR GAS TURBINE ENGINE IGNITION SYSTEMS

BACKGROUND OF THE INVENTION

This application relates generally to gas turbine engines and, more particularly, to a method and apparatus for monitoring gas turbine engine igniter performance.

At least some known gas turbine engines include a compressor, a combustor, an ignition system, and a turbine. Airflow entering the compressor is compressed and directed to the combustor where it is mixed with fuel and ignited using the ignition system, producing hot combustion gases used to drive the turbine.

At least some known ignition systems generate a relatively constant voltage that is output to an igniter. The igniter generates a spark across the igniter gap to initiate combustion of the fuel-air mixture within the combustor. Once the ignition system starts the combustion process, the continuous, controlled inflow of fuel to the combustor is generally sufficient to maintain the combustion process and the power derived from that combustion process.

More specifically, a sufficiently high voltage is required for a spark to jump the igniter gap at a predetermined ambient pressure within the combustor. As the ambient pressure within the combustor increases, the minimum voltage required to produce a spark also increases. During the spark event, a portion of the fuel/air mixture residing within the igniter gap, i.e., the spark path, is ionized such that a spark can occur. As the ambient pressure increases, the quantity of molecules of the fuel/air mixture that must be ionized also increases. Thus, to generate a spark, a voltage supplied to the igniter must also be increased to facilitate ionizing these additional gas molecules and thereby to produce the spark.

If the ambient pressure within the combustor is too high for a given voltage and/or spark gap, the igniter will not spark. More specifically, the ambient pressure within the combustor may eventually reach a pressure at which the igniter tip voltage becomes unable to ionize the gas across a given spark gap, and thus unable to produce a spark, referred to herein as a "quench pressure". Moreover, the spark gap, between the electrode and the grounded side, widens as a portion of the igniter tip material is liberated with each spark. As the spark gap increases the useful remaining life of the igniter is reduced, and a drop in the quench pressure occurs. As a result, when the igniter is supplied with a relatively fixed voltage, any increase in the igniter spark gap results in a corresponding decrease in the quench pressure.

At least some known igniters have a life expectancy that is inversely proportional to the time the igniter is energized. For example, each time the igniter is energized, the remaining life of the igniter is reduced. Other factors that may facilitate reducing the life expectancy of the igniter include factors such as, an operating voltage supplied to the igniter, an igniter material, and/or a corrosiveness and temperature of the operational environment. Therefore, several independent and varying factors can effect the life expectancy of each igniter during its period of use.

At least some known gas turbine engines include igniters that have operated in excess of approximately 12,000 hours. However, estimating the life expectancy of a new igniter and/or the remaining life of a used igniter is problematic. As such, at least some known igniters are replaced when the igniter has been operated for a predetermined quantity of engine hours. For example, at least some known igniters are replaced during a routine scheduled maintenance event. Therefore, at least some igniters are replaced prior to the igniter reaching the end of its service life, whereas other igniters may be replaced after the igniter has reached the end of its service life. Replacing an igniter prior to the end of its service life increases the maintenance and operating costs of the gas turbine engine. Whereas, replacing the igniter at the end of its service life increases the possibility that the engine may not start during normal operation.

BRIEF DESCRIPTION OF THE INVENTION

In one aspect, a method for testing an igniter coupled within a gas turbine engine, wherein the gas turbine engine includes a combustor, a pressure transducer coupled to the combustor, and a spark detector is provided. The method includes operating the gas turbine engine, monitoring the operating pressure within the gas turbine engine, operating the igniter when the monitored pressure is within a first predefined pressure range, and generating a first indication if the igniter failed to generate a spark within the first predefined pressure range.

In another aspect, a control system coupled to a gas turbine engine is provided. The gas turbine engine includes a combustor, at least one igniter, a pressure transducer coupled to the combustor, and a spark detector. The control system includes a processor programmed to operate the gas turbine engine, monitor the operating pressure within the gas turbine engine, operate the igniter when the monitored pressure is within a first predefined pressure range, and generate a first indication if the igniter failed to generate a spark within the first predefined pressure range.

In a further aspect, a gas turbine engine assembly is provided. The gas turbine engine assembly includes a gas turbine engine including a combustor, at least one igniter, a pressure transducer coupled to combustor, and a spark detector; and a control system coupled to the gas turbine engine. The control system includes a processor programmed to operate the gas turbine engine, monitor the operating pressure within the gas turbine engine, operate the igniter when the monitored pressure is within a first predefined pressure range, and generate a first indication if the igniter failed to generate a spark within the first predefined pressure range.

DETAILED DESCRIPTION OF THE INVENTION

Figure 1:
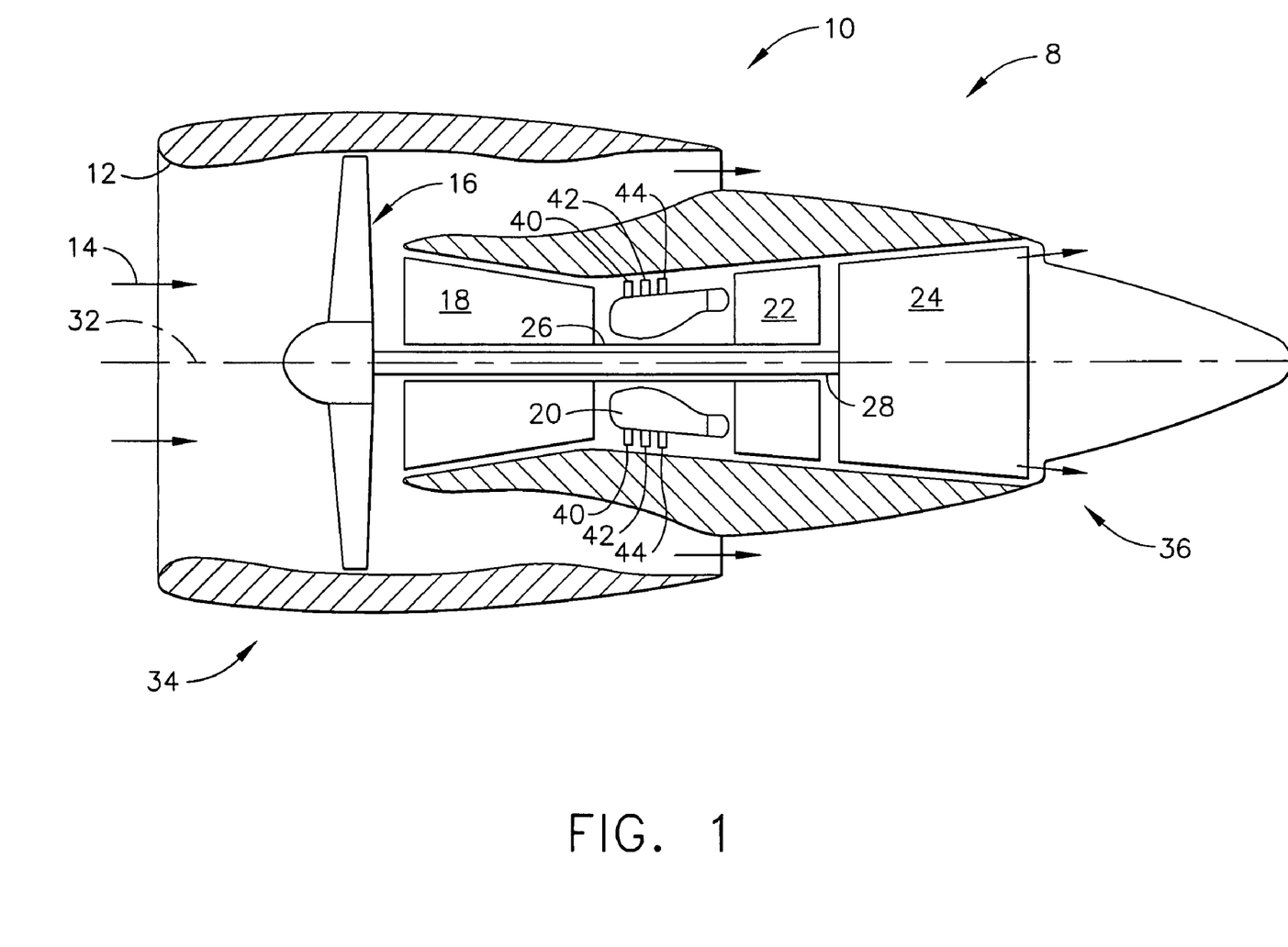
FIG. 1 is a cross-sectional side view of an exemplary gas turbine engine.

FIG. 1 is a schematic illustration of an exemplary gas turbine engine assembly 8 that is installed on an aircraft (not shown). In the exemplary embodiment, gas turbine engine assembly 8 includes a high bypass, turbofan gas turbine engine 10 having in serial flow communication an inlet 12 for receiving ambient air 14, a fan 16, a compressor 18, a combustor 20, a high pressure turbine 22, and a low pressure turbine 24. High pressure turbine 22 is coupled to compressor 18 using a first shaft 26, and low pressure turbine 24 is coupled to fan 16 using a second shaft 28. Gas turbine engine 10 has an axis of symmetry 32 extending from an upstream side 34 of gas turbine engine 10 aft to a downstream side 36 of gas turbine engine 10. In the exemplary embodiment, gas turbine engine 10 also includes at least one igniter 40 that is coupled proximate to combustor 20. Gas turbine engine 10 also includes at least one spark detector 42 and at least one pressure transducer 44 that are each coupled to gas turbine engine 10. In the exemplary embodiment, spark detector 42 is configured to detect a spark that is generated by igniter 40, and pressure transducer 44 is configured to determine a pressure within combustor 20 approximately adjacent to spark igniter 40, referred to herein as PS3.

During operation, airflow (P3) enters gas turbine engine 10 through inlet 12 and is compressed utilizing compressor 18. The compressed air is channeled downstream at an increased pressure and temperature to combustor 20. Fuel is introduced into combustor 20 wherein the air (PS3) and fuel are mixed and ignited within combustor 20 to generate hot combustion gases. Specifically, pressurized air from compressor 18 is mixed with fuel in combustor 20 and ignited utilizing igniter 40, thereby generating combustion gases. Such combustion gases are then utilized to drive high pressure turbine 22 which drives compressor 18 and to drive low pressure turbine 24 which drives fan 16.

Figure 2:
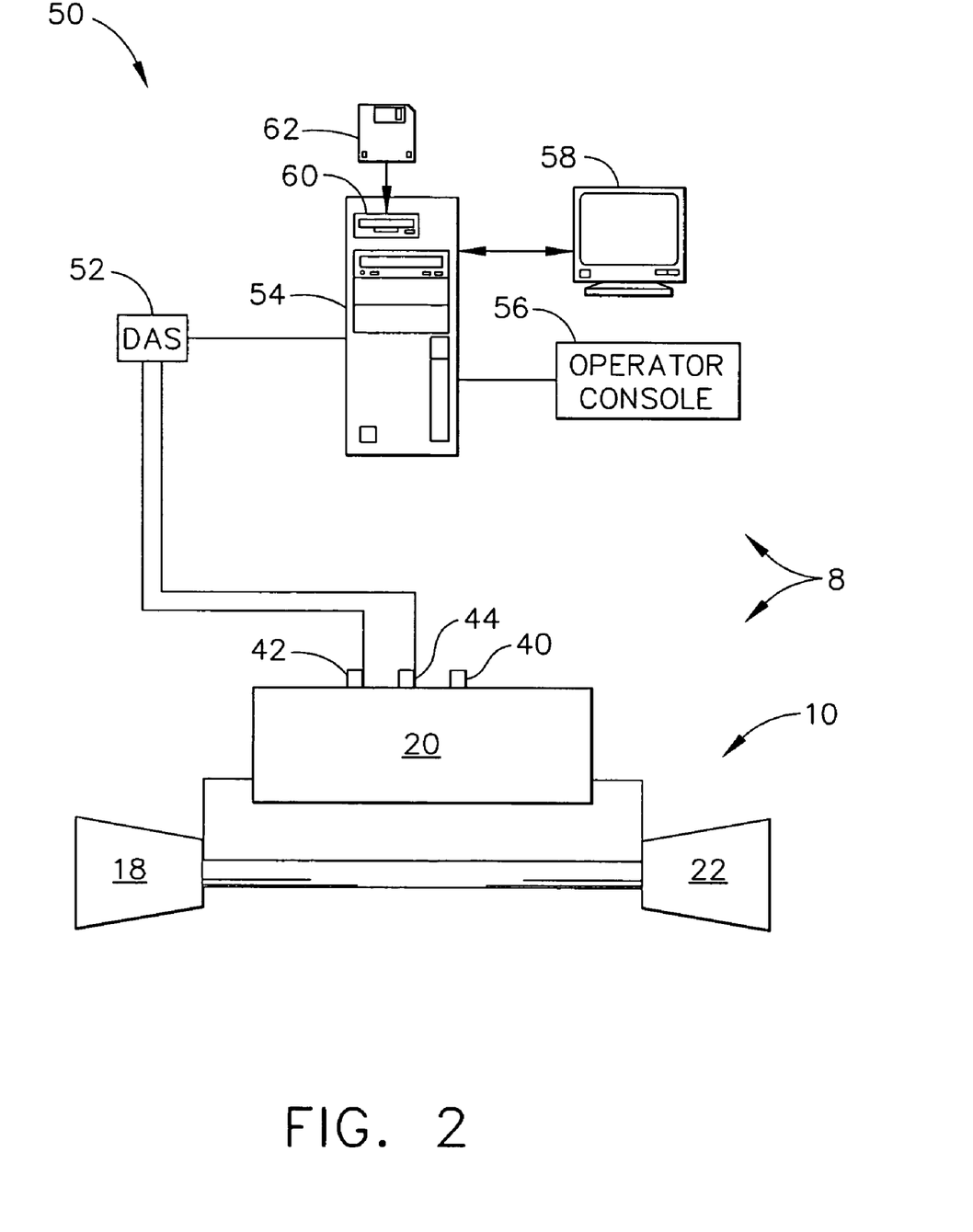
FIG. 2 is a schematic illustration an exemplary Full Authority Digital Engine Control System (FADEC) that can be used with the gas turbine engine shown in FIG. 1.

FIG. 2 is a simplified schematic illustration of an exemplary Full Authority Digital Engine Control (FADEC) system 50 that can be used with gas turbine engine assembly 8 (shown in FIG. 1). In the exemplary embodiment, FADEC 50 is coupled to gas turbine engine 10 and includes a data acquisition system (DAS) 52 that samples analog data received from spark detector 42 and/or pressure transducer 44 and converts the analog data to digital signals for subsequent processing. A computer 54 receives the sampled and digitized sensor data from DAS 52 and performs high-speed data analysis. Although only a single combustor 20 is shown, it should be realized that gas turbine engine 10 can include a plurality of combustors 20 wherein each combustor includes a spark detector 42 and a pressure transducer 44, that are configured to detect a spark and determine a pressure adjacent each respective igniter 40. More specifically at least one spark detector 42 and at least one pressure transducer 44 are coupled to at least one of DAS 52 and/or computer 54, wherein at least one of DAS 52 and/or computer 54 includes an algorithm programmed to determine when an ignition spark event has occurred in gas turbine engine 10.

Computer 54 receives commands from an operator via a keyboard 56. An associated monitor 58 such as, but not limited to, a liquid crystal display (LCD) and/or a cathode ray tube, allows the operator to observe data received from computer 54. The operator supplied commands and parameters are used by computer 54 to provide control signals and information to DAS 52.

In one embodiment, computer 54 includes a device 60, for example, a floppy disk drive, CD-ROM drive, DVD drive, magnetic optical disk (MOD) device, and/or any other digital device including a network connecting device such as an Ethernet device for reading instructions and/or data from a computer-readable medium 62, such as a floppy disk, a CD-ROM, a DVD or an other digital source such as a network or the Internet, as well as yet to be developed digital means. In another embodiment, computer 54 executes instructions stored in firmware (not shown). Computer 54 is programmed to perform the functions described herein, and as used herein, the term computer is not limited to just those integrated circuits generally known as computers, but broadly refers to computers, processors, microcontrollers, microcomputers, programmable logic controllers, application specific integrated circuits, and other programmable circuits, and these terms are used interchangeably herein.

Additionally, although the herein described methods and apparatus are described in an aircraft setting, it is contemplated that the benefits of the invention accrue to those systems typically employed in an industrial setting such as, for example, but not limited to, power plants. Accordingly, and in the exemplary embodiment, gas turbine engine 10 and FADEC 50 are coupled to a vehicle such as an aircraft (not shown) such that information collected by FADEC 50 is either stored in computer 54 on the vehicle, or alternatively, the information is transmitted to a land-based facility and downloaded onto a local computer (not shown). In an alternative embodiment, gas turbine engine 10 and FADEC 50 are installed in a land-based facility such as a power plant.

Figure 3:
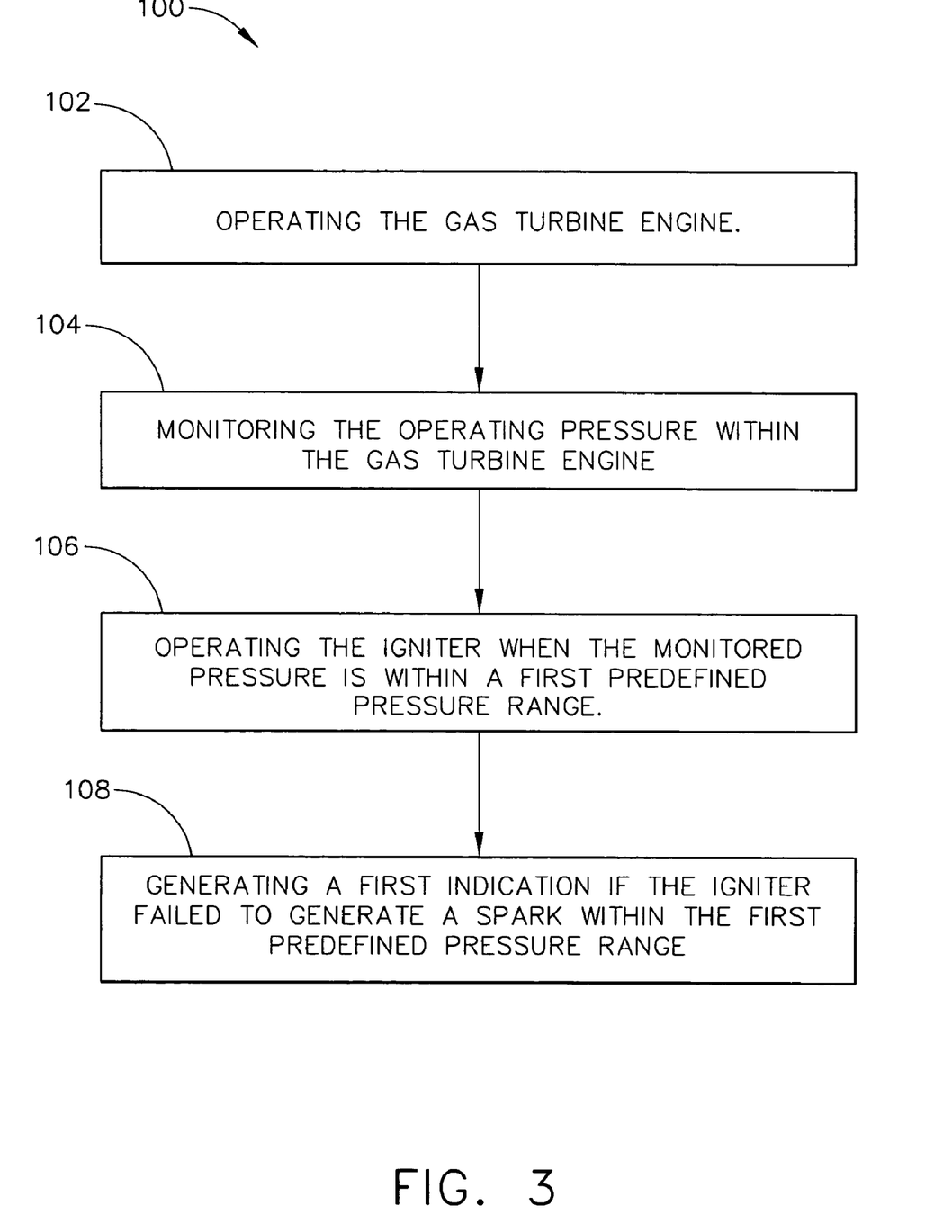
FIG. 3 is flowchart illustrating an exemplary method of a testing a gas turbine engine igniter.

FIG. 3 is a flow chart illustrating an exemplary method 100 for testing an igniter coupled within a gas turbine engine, wherein the gas turbine engine includes a combustor, a pressure transducer coupled to the combustor, and a spark detector. Method 100 includes operating 102 gas turbine engine 10, monitoring 104 the operating pressure within gas turbine engine 10, operating 106 igniter 40 when the monitored pressure is within a first predefined pressure range, and generating 108 a first indication if igniter 40 fails to generate a spark within the first predefined pressure range.

Figure 4:
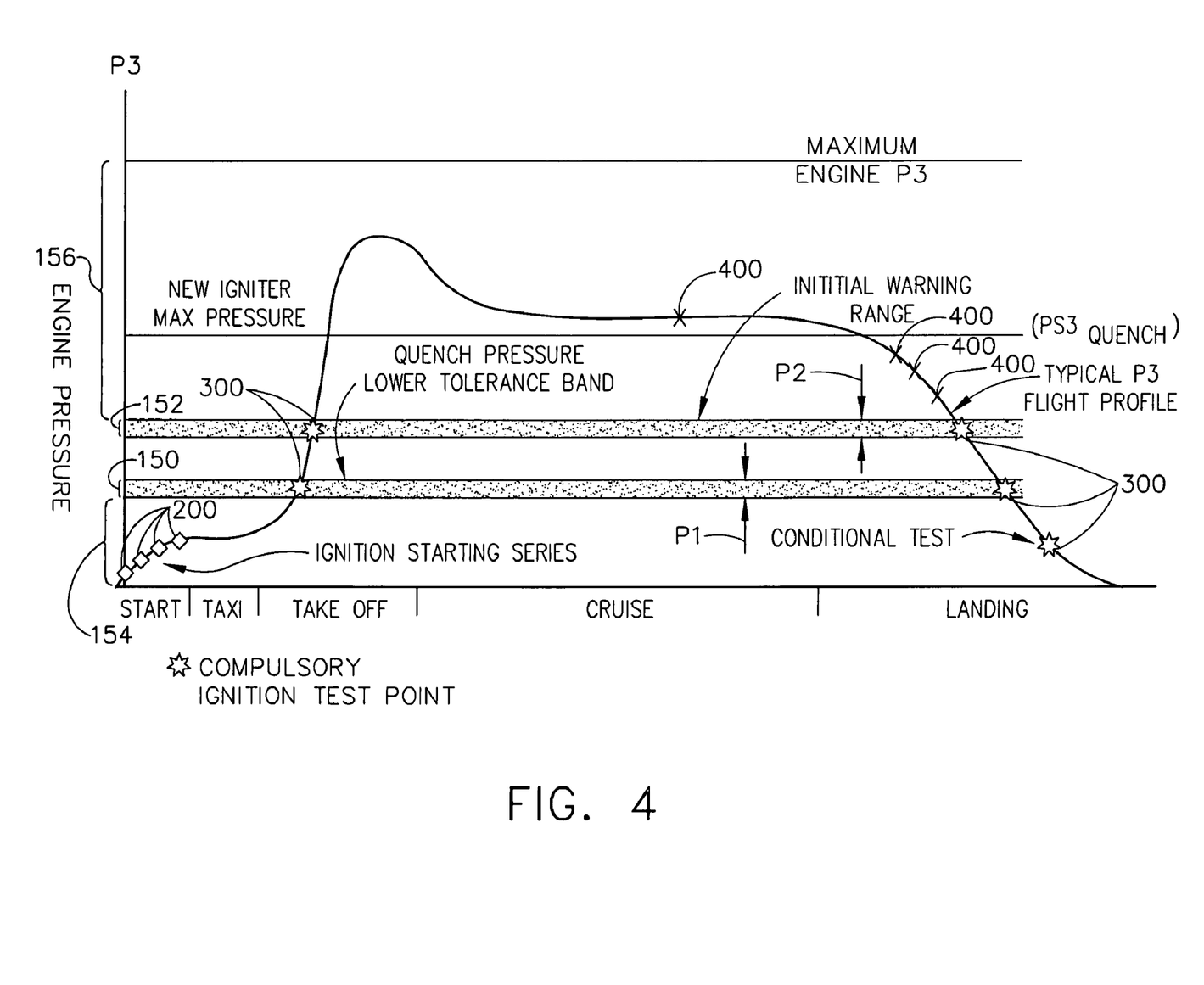
FIG. 4 is a graphical illustration of an exemplary gas turbine engine 10 utilizing the method shown in FIG. 3.

FIG. 4 is a graphical illustration of an exemplary gas turbine engine 10 utilizing the method shown in FIG. 3. For example, during operation, gas turbine engine 10 is initialized or started. The pressure (P3) within gas turbine engine 10 increases thus increasing the pressure within combustor 20 (PS3). In the exemplary embodiment, the gas turbine engine pressure (P3) varies in response to a plurality of engine factors including, but not limited to, engine speed, and aircraft altitude. Accordingly, and in the exemplary embodiment, monitoring 104 the operating pressure within gas turbine engine 10 includes monitoring the pressure within combustor 20 utilizing a first pressure transducer 44, for example. In another embodiment, monitoring 104 the operating pressure within gas turbine engine 10 includes monitoring the pressure at any location within gas turbine engine 10 using a second pressure transducer (not shown), such as, but not limited to, the compressor discharge pressure (CDP).

In the exemplary embodiment, data received from the second transducer is utilized by FADEC 50 to estimate a pressure approximately adjacent igniter 40. More specifically, a pressure received from a plurality of points within gas turbine engine 10 can be utilized by FADEC 50 to determine the pressure adjacent igniter 40. For example, if FADEC 50 receives a signal indicative of the compressor discharge pressure, FADEC 50 includes an algorithm to determine the pressure adjacent igniter 40 based on the compressor discharge pressure. Moreover, FADEC 50 includes an algorithm to facilitate compensating for any lag in the engine pressure signal received. For example, during a rapid engine pressure increase, FADEC 50 includes an algorithm to estimate when the engine pressure will be within any of the predefined pressure ranges, and thus initiates a spark event based on the estimated pressure within gas turbine engine 10. In the exemplary embodiment, the pressure within gas turbine engine 10 is continuously monitored while gas turbine engine 10 is operating.

Method 100 also includes operating 106 igniter 40 when the monitored pressure is within a first predefined pressure range. More specifically, as shown in FIG. 4, FADEC 50 operates igniter 40 to facilitate starting the combustion process within gas turbine engine 10. FADEC 50 utilizes a signal received from spark detector 42 to determine whether igniter 40 has initiated a spark event. Approximately simultaneously, FADEC 50 utilizes a signal received from pressure transducer 44 to determine the pressure approximately adjacent to igniter 40. In the exemplary embodiment, FADEC 50 operates igniter 40 a plurality of times during the engine start sequence, taxi, take-off, cruise, and landing.

For example, during starting, FADEC 50 operates igniter 40 to initiate at least one spark event 200 to facilitate starting gas turbine engine 10. After gas turbine engine 10 is started, additional fuel is provided to engine 10 during take-off, thus pressure (P3) within gas turbine engine 10 is increased. During takeoff, for example, the pressure within gas turbine engine 10 will eventually increase until the pressure within combustor 20 (PS3) enters a first predefined pressure range 150. In the exemplary embodiment, first pre-defined pressure range 150 is between approximately 70 psi and approximately 90 psi. FADEC 50 then operates igniter 40 to initiate a spark event 300 within first predefined pressure range 150. FADEC 50 utilizes a signal received from spark detector 42 to determine whether igniter 40 has initiated a spark event. Approximately simultaneously, FADEC 50 utilizes a signal received from pressure transducer 44 to determine the pressure (PS3) approximately adjacent to igniter 40. If FADEC 50 does not receive a signal from spark detector 42, i.e. spark igniter 40 has failed to generate a spark within first predefined pressure range 150, FADEC 50 generates a first indication indicating that igniter 40 has failed to generate a spark within first predefined pressure range 150. In one embodiment, the first indication is transmitted to a pilot and/or other person of interest on the aircraft. In another embodiment, the first indication is transmitted to ground station personnel to facilitate notifying the ground station personnel that igniter 40 has failed to ignite on the aircraft. In the exemplary embodiment, the first indication is utilized to prompt the operator and/or the ground maintenance personnel to replace igniter 40.

As the aircraft proceeds through take-off, P3 continues to increase to a second predefined pressure range 152. FADEC 50 then operates igniter 40 to initiate a spark event 300 within second predefined pressure range 152 that is greater than first predefined pressure range 150. In the exemplary embodiment, second pre-defined pressure range 152 is between approximately 120 psi and approximately 140 psi. In another embodiment, second pre-defined pressure range 152 is between approximately 110 psi and approximately 150 psi. In the exemplary embodiment, both first and second predefined pressure ranges 150 and 152 are both determined based on the specific engine. For example, in the exemplary embodiment, both first and second predefined pressure ranges 150 and 152 are determined based on the operational characteristics of exemplary gas turbine engine 10 (shown in FIG. 1). Alternatively, both first and second predefined pressure ranges 150 and 152 may be adjusted to compensate for different operational characteristics of a plurality of different gas turbine engines.

In the exemplary embodiment, FADEC 50 then operates igniter 40 to initiate a spark event 300 within second predefined pressure range 152. FADEC 50 utilizes a signal received from spark detector 42 to determine whether igniter 40 has initiated a spark event. Approximately simultaneously, FADEC 50 utilizes a signal received from pressure transducer 44 to determine the pressure (PS3) approximately adjacent to igniter 40. If FADEC 50 does not receive a signal from spark detector 42, i.e. spark igniter 40 has failed to generate a spark within second predefined pressure range 152, FADEC 50 generates a second indication indicating that igniter 40 has failed to generate a spark within second predefined pressure range 152. In one embodiment, the second indication is transmitted to a pilot and/or other person of interest on the aircraft. In another embodiment, the second indication is transmitted to ground station personnel to facilitate notifying the ground station personnel that igniter 40 has failed to ignite on the aircraft. In the exemplary embodiment, the second indication is utilized to prompt the operator and/or the ground maintenance personnel to schedule a maintenance event in order to replace igniter 40.

During normal flight conditions, the pressure within gas turbine engine 10 is generally above the igniter quench pressure. Accordingly, in the exemplary embodiment, method 100 is not utilized, when the aircraft is operated with a gas turbine engine pressure that exceeds the igniter quench pressure. In an alternative embodiment, FADEC 50 operates igniter 40 to initiate a spark event 300 within fourth predefined pressure range 156 that is greater than second predefined pressure range 152. Initiating a spark event in the fourth predefined pressure range 156 facilitates allowing an operator to verify that igniter 40 is functioning properly at relatively high gas turbine engine pressures and/or relatively high altitudes. More specifically, initiating a spark event within fourth predefined pressure range 156 provides an indication to the operator such that the operator has a greater confidence that igniter 40 is functioning properly, and that igniter 40 will operate properly to restart gas turbine engine 10 during all flight conditions as the result of a gas turbine engine flame-out, for example.

In the exemplary embodiment, as P3 decreases to second predefined pressure range 152, during landing for example, at least one additional igniter test is performed within second predefined pressure range 152. Specifically, FADEC 50 operates igniter 40 to initiate a spark event 300 within second predefined pressure range 152. FADEC 50 utilizes a signal received from spark detector 42 to determine whether igniter 40 has initiated a spark event. Approximately simultaneously, FADEC 50 utilizes a signal received from pressure transducer 44 to determine the pressure (PS3) approximately adjacent to igniter 40. If FADEC 50 does not receive a signal from spark detector 42, i.e. spark igniter 40 has failed to generate a spark within second predefined pressure range 152, FADEC 50 generates the second indication indicating that igniter 40 has failed to generate a spark within second predefined pressure range 152.

As the aircraft prepares for landing operations, P3 decreases to first predefined pressure range 150. FADEC 50 then operates igniter 40 to initiate a spark event 300 within first predefined pressure range 150. FADEC 50 utilizes a signal received from spark detector 42 to determine whether igniter 40 has initiated a spark event. Approximately simultaneously, FADEC 50 utilizes a signal received from pressure transducer 44 to determine the pressure (PS3) approximately adjacent to igniter 40. If FADEC 50 does not receive a signal from spark detector 42, i.e. spark igniter 40 has failed to generate a spark within first predefined pressure range 150, FADEC 50 generates a first indication indicating that igniter 40 has failed to generate a spark within first predefined pressure range 150.

In the exemplary embodiment, FADEC 50 is also programmed to perform an igniter test within a third predefined pressure range 154. In the exemplary embodiment, third predefined pressure range is between 0 psi and first predefined pressure range 150. Testing igniter 40 within third predefined pressure range 154 facilitates verifying the operability of the entire ignition system. For example, when gas turbine engine 10 is operating within third predefined pressure range 154, the quench pressure is sufficiently low such that igniter 40 should generate a spark within third predefined pressure range 154. Accordingly, generating a spark event 300 within third predefined pressure range 154 facilitates testing the operability of the gas turbine engine ignition system. More specifically, and in the exemplary embodiment, generating a spark event 300 within third predefined pressure range 154 facilitates testing the operability of igniter 40, spark sensor 42, pressure transducer 44, and/or FADEC 50 to facilitate ensuring that a spark is generated and/or the generated spark is detected by spark sensor 42, and transmitted to FADEC 50.

Accordingly, during normal operation, FADEC 50 performs an igniter spark test at three combustor pressures of interest, first predefined pressure range 150, second predefined pressure range 152, and third predefined pressure range 154, i.e., the minimum desired pressure at which spark occurs. Specifically, testing igniter 40 within the second predefined pressure range 152 gives adequate margin from first predefined pressure range 150 for the user or operator to plan for igniter replacement during the remaining igniter life as the igniter's quench pressure degrades from second predefined pressure range 152 to first predefined pressure range 150. A predetermined engine environmental pressure, i.e. first predefined pressure range 150, at which if the igniter is not capable of sparking, is thus considered to be close enough to the end of its useful life to be replaced.

In another exemplary embodiment, igniter 40 is tested a plurality of times, i.e. at a plurality of quench pressure data points 400, during the flight envelope to generate an igniter deterioration curve. More specifically, the quench pressure data points 400 are utilized by an algorithm installed in FADEC 50 to generate a deterioration profile, that is representative of the quench pressure data points collected during igniter testing. For example, as shown in FIG. 4, during normal operation, an exemplary igniter will function normally for the majority of its lifetime, i.e. the igniter quench pressure will remain relatively constant. However, as the igniter begins to deteriorate, the igniter quench pressure will rapidly decrease, i.e. kneeover, until the igniter fails to operate. Accordingly, during the exemplary embodiment, a plurality of quench pressure data points 400 are collected within range 156 to facilitate "bracketing" the quench pressure. More specifically, the plurality of quench pressure data points 400 are utilized to determine the current quench pressure of the specific igniter. After the current quench pressure is determined, an operator may perform testing on subsequent flights to track the change in igniter quench pressure until the quench pressure falls to a predetermined level, at which time the igniter is either replaced, or a maintenance event is scheduled to replace the igniter.

In the exemplary embodiment, the lower limit of expected igniter life is approximately 500 hours of operation, the median limit is approximately 800–900 hours of operation, and the upper limit is approximately 1200 hours of engine operation. The igniter performance model is then utilized by FADEC 50 to facilitate predicting the remaining useful life of igniter 40.

Accordingly, during normal operation, FADEC 50 performs an igniter spark test at three combustor pressures of interest, the minimum desired pressure at which spark occurs, and a higher pressure which gives adequate margin from the minimum for the user or operator to plan for igniter replacement during the remaining igniter life as the igniter's quench pressure degrades, and a third pressure that is lower than the first pressure to verify the operability of the ignition system.

Described herein is a method and apparatus to test an igniter in a gas turbine ignition system. The system includes a sufficiently fast (low time-constant) pressure sensor, an igniter spark sensor that indicates the moment that igniter spark occurs, environmental pressure anticipation derived from previously known engine design performance parameters, and electronics to perform the timing and calculations. The system determines the moment that the engine environmental pressure reaches some point of interest, then, having already reserved sufficient time to create a full spark charge in anticipation of the moment, initiates the spark event. The system first determines if the spark occurred, and if so, the igniter is acceptable at that level of engine environmental pressure, and if not, the igniter has failed, and is not capable at that level of engine pressure. Further igniter test events performed at additional pressures are utilized to confirm that the test methods, and the tested ignition system components, are operational and that the ignition system is still functional at the lower pressure.

Moreover, the computer, i.e. FADEC 50, continuously monitors environmental pressure within the gas turbine engine, anticipates the moment when the engine pressure enters the range of interest for the pressure, and then immediately initiates the spark event to occur within that range of pressure of interest. The computer measures, records, and reports the results of ignition system testing at each test pressure and the igniter spark or no-spark response to each pressure. The computer then provides a status signal to the user or operator or maintenance to have the igniter replaced or alternatively to schedule an igniter maintenance event. Additionally, the computer initiates ignition at lower pressures to assure that the ignition system is still functional below the quench pressure and provides the status to the operator or user.

An exemplary method and apparatus for monitoring and estimating the remaining operational life of a gas turbine engine igniter are described herein. The methods and apparatus illustrated are not limited to the specific embodiments described herein, but rather, components of each may be utilized independently and separately from other components described herein. For example, the computer algorithm can also be used in combination with a variety of other turbine engines.

Moreover, the methods and apparatus described herein provide users and operators of gas turbine engines the ability to test the gas turbine engine igniter and/or ignition system to closely monitor an individual igniter, on a regular basis, prior to the igniter's impending failure to spark. The methods and apparatus described herein therefore provide maximum utility of the igniter to the user, and secondly, provide an opportunity for the user or operator to plan the replacement the igniter before the occurrence of failure.

While the invention has been described in terms of various specific embodiments, those skilled in the art will recognize that the invention can be practiced with modification within the spirit and scope of the claims.

What is claimed is:

1. A method for testing an igniter coupled within a gas turbine engine, wherein the gas turbine engine includes a combustor, a pressure transducer coupled to the combustor, and a spark detector, said method comprising:
   operating the gas turbine engine;
   monitoring the operating pressure within the gas turbine engine;
   operating the igniter when the monitored pressure is within a first predefined pressure range;
   generating a first indication if the igniter failed to generate a spark within the first predefined pressure range; and
   transmitting the first indication for viewing by an operator.

2. A method in accordance with claim 1 further comprising replacing the igniter based on the first indication.

3. A method in accordance with claim 1 further comprising:
   operating the igniter when the monitored pressure is within a second predefined pressure range that is different than the first predefined pressure range; and
   generating a second indication that is different than the first indication if the igniter failed to generate a spark within the second predefined pressure range.

4. A method in accordance with claim 3 further comprising scheduling an igniter maintenance event based on the second indication.

5. A method in accordance with claim 3 further comprising:
   detecting the igniter spark utilizing the spark detector; and
   correlating the combustor pressure to the moment of occurrence of the detected igniter spark to determine whether the igniter produced a spark within at least one of the first and second predefined pressure ranges.

6. A method in accordance with claim 3 wherein the second predefined pressure range is greater than the first predefined pressure range.

7. A method in accordance with claim 3 further comprising:
   operating the igniter when the monitored pressure is within a third predefined pressure range that is less than the first predefined pressure range; and
   generating a third indication that is different than the first and second indications, wherein the third indication is utilized to verify that at least one of the pressure transducer, the spark detector, and the igniter are operational.

8. A method in accordance with claim 7 further comprising transmitting at least one of the first indication, the second indication, and the third indication to a remote location.

9. A control system coupled to a gas turbine engine, wherein the gas turbine engine includes a combustor, at least one igniter, a pressure transducer coupled to the combustor, and a spark detector, said control system comprising a processor programmed to:
   operate the gas turbine engine;
   monitor the operating pressure within the gas turbine engine;
   operate the igniter when the monitored pressure is within a first predefined pressure range;
   generate a first indication if the igniter failed to generate a spark within the first predefined pressure; and
   transmit the first indication for viewing by an operator.

10. A control system in accordance with claim 9 wherein said processor is further programmed to prompt an operator to replace the igniter based on the first indication.

11. A control system in accordance with claim 9 wherein said processor is further programmed to:
   operate the igniter when the monitored pressure is within a second predefined pressure range that is greater than the first predefined pressure range; and
   generate a second indication that is different than the first indication if the igniter failed to generate a spark within the second predefined pressure range.

12. A method in accordance with claim 11 wherein said processor is further programmed to prompt an operator to schedule an igniter maintenance event based on the second indication.

13. A control system in accordance with claim 11 wherein said processor is further programmed to:
   detect the igniter spark utilizing the spark detector; and
   correlate the combustor pressure to the moment of occurrence of the detected igniter spark to determine whether the igniter produced a spark within at least one of the first and second predefined pressure ranges.

14. A control system in accordance with claim 11 wherein said processor is further programmed to:
   operate the igniter when the monitored pressure is within a third predefined pressure range that is less than the first predefined pressure range; and
   generate a third indication that is different than the first and second indications, wherein the third indication is utilized to verify that at least one of the pressure transducer, the spark detector, and the igniter are operational.

15. A control system in accordance with claim 11 wherein said processor is further programmed to transmit at least one of the first indication, the second indication, and the third indication to a remote location.

16. A gas turbine engine assembly comprising:
   a gas turbine engine including a combustor, at least one igniter, a pressure transducer coupled to combustor, and a spark detector; and
   a control system coupled to said gas turbine engine, said control system comprising a processor programmed to:
   operate the gas turbine engine;
   monitor the operating pressure within the gas turbine engine;
   operate the igniter when the monitored pressure is within a first predefined pressure range;
   generate a first indication if the igniter failed to generate a spark within the first predefined pressure range;
   operate the igniter when the monitored pressure is within a second predefined pressure range that is greater than the first predefined pressure range;
   generate a second indication that is different than the first indication if the igniter failed to generate a spark within the second predefined pressure range; and
   transmit at least one of the first indication and the second indication for viewing by an operator.

17. A gas turbine engine assembly in accordance with claim 16, wherein said processor is further programmed to:
   prompt an operator to replace the igniter based on the first indication; and
   prompt an operator to schedule an igniter maintenance event based on the second indication.

18. A gas turbine engine assembly in accordance with claim 16, wherein said processor is further programmed to:
   detect the igniter spark utilizing the spark detector; and
   correlate the combustor pressure to the moment of occurrence of the detected igniter spark to determine whether the igniter produced a spark within at least one of the first and second predefined pressure ranges.

19. A gas turbine engine assembly in accordance with claim 16, wherein said processor is further programmed to:
operate the igniter when the monitored pressure is within a third predefined pressure range that is less than the first predefined pressure range; and
generate a third indication that is different than the first and second indications, wherein the third indication is utilized to verify that at least one of the pressure transducer, the spark detector, and the igniter are operational.

20. A gas turbine engine assembly in accordance with claim 19, wherein said processor is further programmed to transmit at least one of the first indication, the second indication, and the third indication to a remote location.

* * * * *

UNITED STATES PATENT AND TRADEMARK OFFICE
CERTIFICATE OF CORRECTION

| | |
|---|---|
| PATENT NO. | : 7,191,084 B2 |
| APPLICATION NO. | : 11/110487 |
| DATED | : March 13, 2007 |
| INVENTOR(S) | : Ponziani |

Page 1 of 1

It is certified that error appears in the above-identified patent and that said Letters Patent is hereby corrected as shown below:

In Claim 9, column 9, line 63, after "a spark within the first predefined pressure" insert -- range --.

Signed and Sealed this

Eighteenth Day of September, 2007

JON W. DUDAS
*Director of the United States Patent and Trademark Office*